United States Patent
Ross

(10) Patent No.: US 6,386,649 B1
(45) Date of Patent: May 14, 2002

(54) TWO SOLENOID PRESSURE MODULATED RELAY VALVE WITH INTEGRAL QUICK RELEASE FUNCTION FOR ABS

(75) Inventor: Charles E. Ross, Nova, OH (US)

(73) Assignee: AlliedSignal Truck Brake Systems, Elyria, OH (US)

( * ) Notice: Subject to any disclaimer, the term of this patent is extended or adjusted under 35 U.S.C. 154(b) by 0 days.

(21) Appl. No.: 09/410,519

(22) Filed: Oct. 1, 1999

(51) Int. Cl.[7] .................................................. B60T 8/34
(52) U.S. Cl. .............................. 303/119.2; 303/118.1; 303/127; 303/3
(58) Field of Search ........................ 303/118.1, 119.1, 303/119.2, 115.1, 115.2

(56) References Cited

U.S. PATENT DOCUMENTS

| | | | | |
|---|---|---|---|---|
| 3,857,614 A | * | 12/1974 | Kurichh | 303/118.1 |
| 4,068,902 A | | 1/1978 | Deem et al. | |
| 4,175,795 A | * | 11/1979 | Mortimer | 303/118.1 |
| 5,046,786 A | * | 9/1991 | Johnston et al. | 303/7 |
| 5,240,271 A | * | 8/1993 | Hart et al. | 280/421 |
| 5,286,102 A | * | 2/1994 | Nakamura | 303/113.2 |
| 5,439,277 A | | 8/1995 | Higashi | |
| 5,722,740 A | * | 3/1998 | Engelbert | 303/118.1 |
| 5,762,094 A | * | 6/1998 | Hendershot | 137/204 |
| 6,206,481 B1 | * | 3/2001 | Kaisers et al. | 303/7 |
| 6,209,971 B1 | * | 4/2001 | Ho et al. | 303/119.3 |
| 6,238,013 B1 | * | 5/2001 | Koelzer | 303/118.1 |
| 6,247,764 B1 | * | 6/2001 | Koelzer | 303/118.1 |
| 6,264,286 B1 | * | 7/2001 | Ehrlich et al. | 303/7 |
| 6,305,759 B1 | * | 10/2001 | Ho et al. | 303/118.1 |

FOREIGN PATENT DOCUMENTS

WO     WO92/16400     10/1992

* cited by examiner

*Primary Examiner*—J. J. Swann
*Assistant Examiner*—David A. Divine
(74) *Attorney, Agent, or Firm*—Calfee, Halter & Griswold LLP

(57) ABSTRACT

A two solenoid pressure modulated ABS relay valve incorporates a quick release valve in the control air circuit to allow a majority of the air in the control cavity to escape directly to ambient. The orifice through the exhaust solenoid need only handle a relatively small volume of air upstream of the quick release valve, i.e., between the quick release diaphragm and the inlet solenoid seat.

6 Claims, 4 Drawing Sheets

TWO SOLENOID PRESSURE MODULATED RELAY VALVE WITH INTEGRAL QUICK RELEASE FUNCTION FOR ABS

BACKGROUND OF THE INVENTION

This application relates to the art of braking systems, and more particularly to an antilock brake system (ABS) modulator relay valve. The invention is particularly applicable to a tractor or tractor-trailer type vehicle equipped with an air braking system in which a vehicle operator generates a control signal to operate a brake control valve. The signal is transmitted to relay valves which communicate compressed air from storage reservoirs to vehicle brakes. It will be appreciated, however, that the invention may relate to similar environments and applications.

A modulator relay valve for ABS brake systems typically includes an impermeable or solid walled piston or flexible diaphragm that selectively moves during normal service braking to establish communication among supply, delivery, and exhaust ports. The piston is responsive to a control signal provided, for example, from a foot brake valve or trailer control valve. The piston then selectively activates an inlet/exhaust valve to selectively connect the supply, delivery, and exhaust ports. In response to an antilock control event, a solenoid control assembly provides for a rapid pulsing of the brake application. That is, if an antilock event is sensed, an electronic control unit sends suitable signals to solenoid valve assemblies associated with the modulator. The valve assemblies provide an electro-pneumatic interface between the electronic control unit and the airbrake system. If an impending wheel lockup is sensed, the antilock controller immediately begins to modify brake application using the modulator. Air on one side of the modulator piston is controlled by selectively opening and closing the supply and exhaust solenoid valve assemblies. Coils associated with the respective solenoid valve assemblies are quickly energized or deenergized in a predetermined sequence by the controller. When the solenoid coil is energized, a core or shuttle is moved to either open or close an associated air passage. This either opens or closes the exhaust passage or reapplies air pressure to the brake actuator. By opening or closing the solenoid valves, the anti-lock controller simulates brake "pumping" but at a rate substantially faster than the driver of a vehicle could actually pump the brakes to avoid skidding.

To achieve good ABS performance in air brake vehicles, a significant actor is the ability to rapidly exhaust service air from the brake chamber. In known two solenoid relay valve arrangements, control air from a relay valve control cavity is exhausted through an orificed exhaust solenoid passage. As will be appreciated, the orificed exhaust passage is relatively small. One proposed solution is to employ a larger solenoid, i.e., a solenoid having a larger orifice or exhaust passage, so that the passage would not serve as a bottleneck for the exhaust function during an antilock control event. However, a larger solenoid is less efficient and requires additional power to operate. It is for these reasons that present arrangements use an exhaust solenoid of a predetermined size and exhaust the control air from the relay valve control cavity through the exhaust solenoid passage. Thus, any improvement that addresses these concerns would be desirable, particularly if easily incorporated into an existing modulator valve without substantial modification.

SUMMARY OF THE INVENTION

The present invention contemplates an improved modulator relay valve employing a quick release valve in the control air circuit to allow control air contained therein to escape directly to atmosphere.

In accordance with a preferred embodiment of the invention, a quick release valve is interposed between the control cavity and the exhaust solenoid. In this manner, a majority of the control air contained in the cavity is permitted to escape directly to atmosphere through the quick release valve. The exhaust solenoid passage need only exhaust the relatively small volume of air disposed between the quick release diaphragm and the supply solenoid seat.

According to another aspect of the invention, the conventional antilock braking system is easily modified to incorporate this improvement.

A principal advantage of the invention is the ability to improve ABS performance on air braked vehicles.

Another advantage of the invention resides in the ability to achieve improved exhaust of control air from the relay valve control cavity without increasing the size and power constraints associated with the present solenoid valve assembly.

Still another advantage of the invention is the ability to easily modify the existing system to incorporate this feature.

Still other advantages and benefits of the invention will become apparent to those skilled in the art upon a reading and understanding of the following detailed description. dr

BRIEF DESCRIPTION OF THE DRAWINGS

The invention may take physical form in certain parts and arrangements of parts, a preferred embodiment of which will be described in detail in this specification. The preferred embodiment is illustrated in the accompanying drawings and forms a part of the invention, wherein.

DETAILED DESCRIPTION OF THE PREFERRED EMBODIMENT

Figure 1:
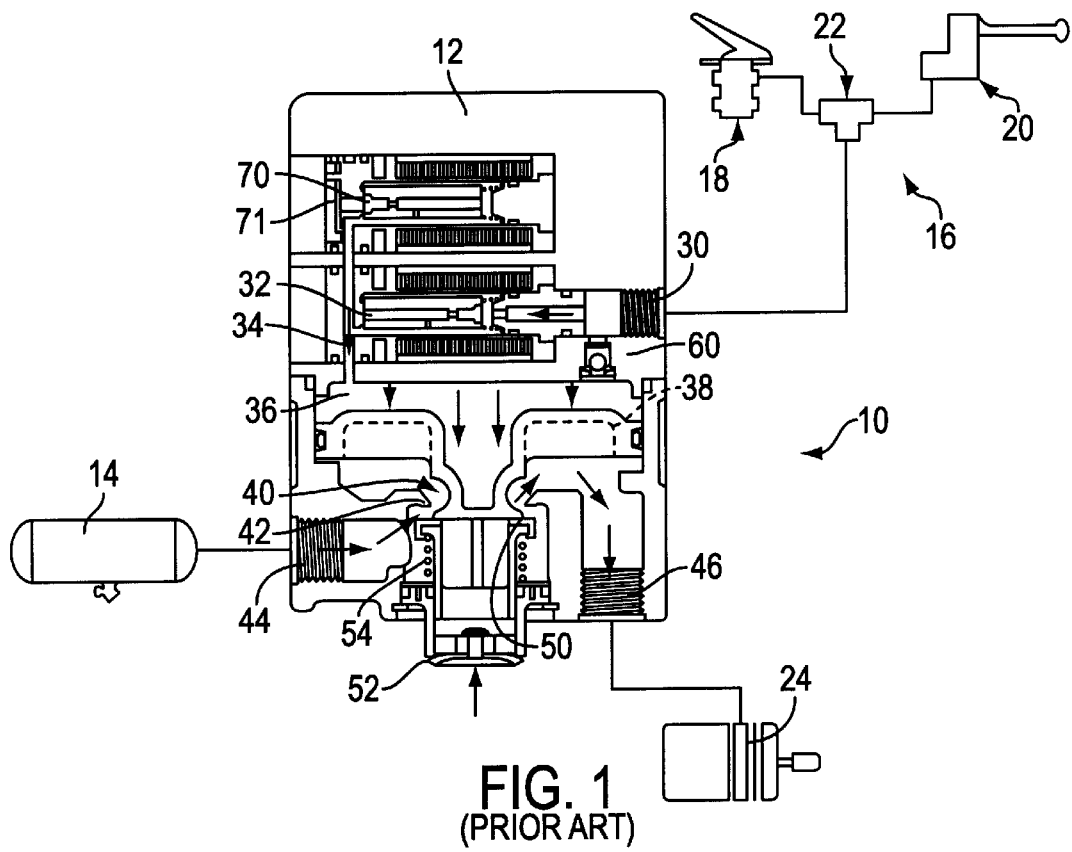
FIG. 1 is a schematic representation of a prior art, two solenoid modulating relay valve assembly shown in a normal service application position.

FIGS. 1–4 illustrate a conventional pressure modulating relay valve assembly 10 having a housing 12 that communicates with an air supply or pressurized air reservoir 14 and a control valve 16, which may include a foot-brake valve 18 and a trailer control valve 20 interconnected, for example, by a double-check valve 22. The relay valve housing 12 also communicates with a service brake chamber 24. A control port 30 selectively receives an air pressure signal from either the brake valve or trailer control valve. The air passes through an inlet or supply solenoid valve assembly 32 and passage 34 for communication with a control volume or cavity 36 defined by a first or upper face of the piston 38 sealingly received in the housing. The pressurized air acts on the piston and urges it toward a position as shown in FIG. 1 where an inlet/exhaust valve 40 opens communication between the storage reservoir 14 and the brake chamber 24. That is, a lower side of the relay piston 38 engages and urges the inlet/exhaust valve from associated seat 42. This establishes communication between the air reservoir 14 and the brake chamber 24 as illustrated by the arrows in FIG. 1. Thus, supply port 44 communicates with delivery port 46. The movement of the piston also engages a valve seat 50 to preclude further communication with exhaust port 52. Consequently, the brake chamber 24 which is normally in communication with the exhaust port, is then actuated or pressurized by the air, as exhibited in FIG. 1.

Figure 2:
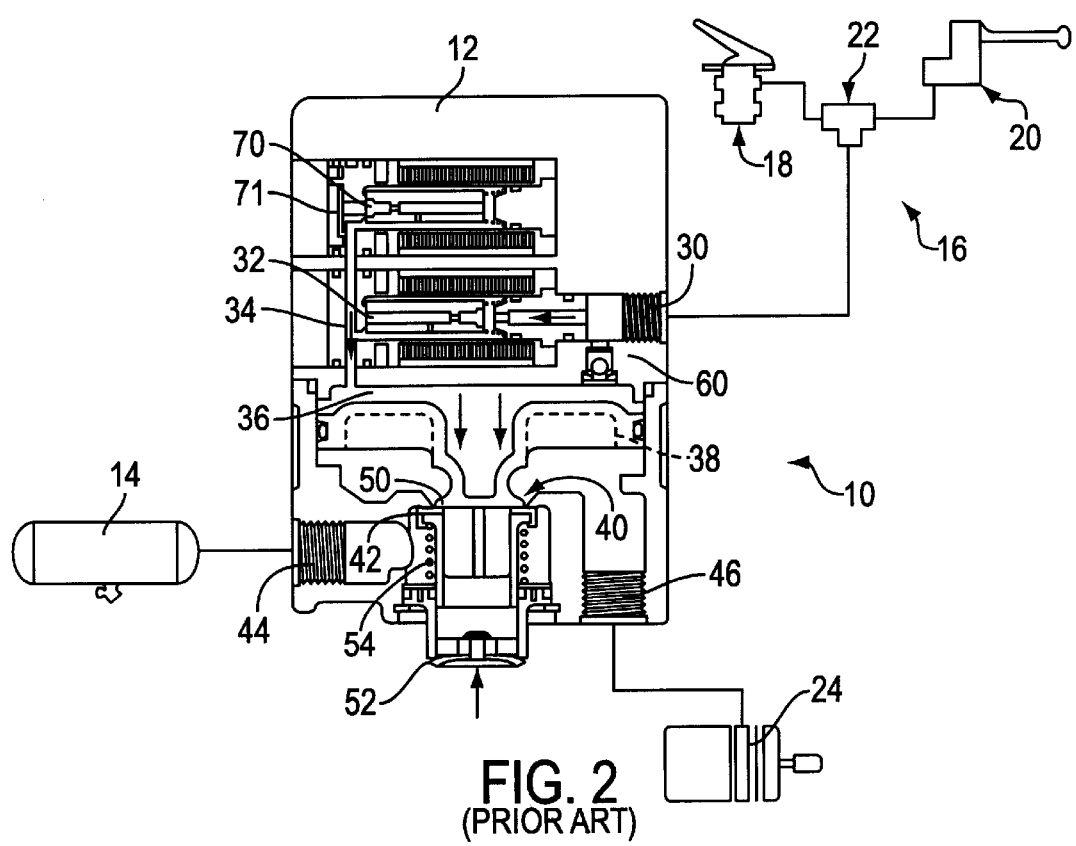
FIG. 2 is a view similar to FIG. 1 illustrating the relay valve in a balanced or hold position.

FIG. 2 represents a balance or hold position where air is still communicated from the brake trailer control valve to the port 30, thus pressurizing the upper side of the piston. Likewise, the second or underside of the piston has reached the state where air pressure, in conjunction with the biasing force of spring 54, provides for inlet/exhaust valve 40 to be seated against both valve seat 42 and valve seat 50.

Figure 3:
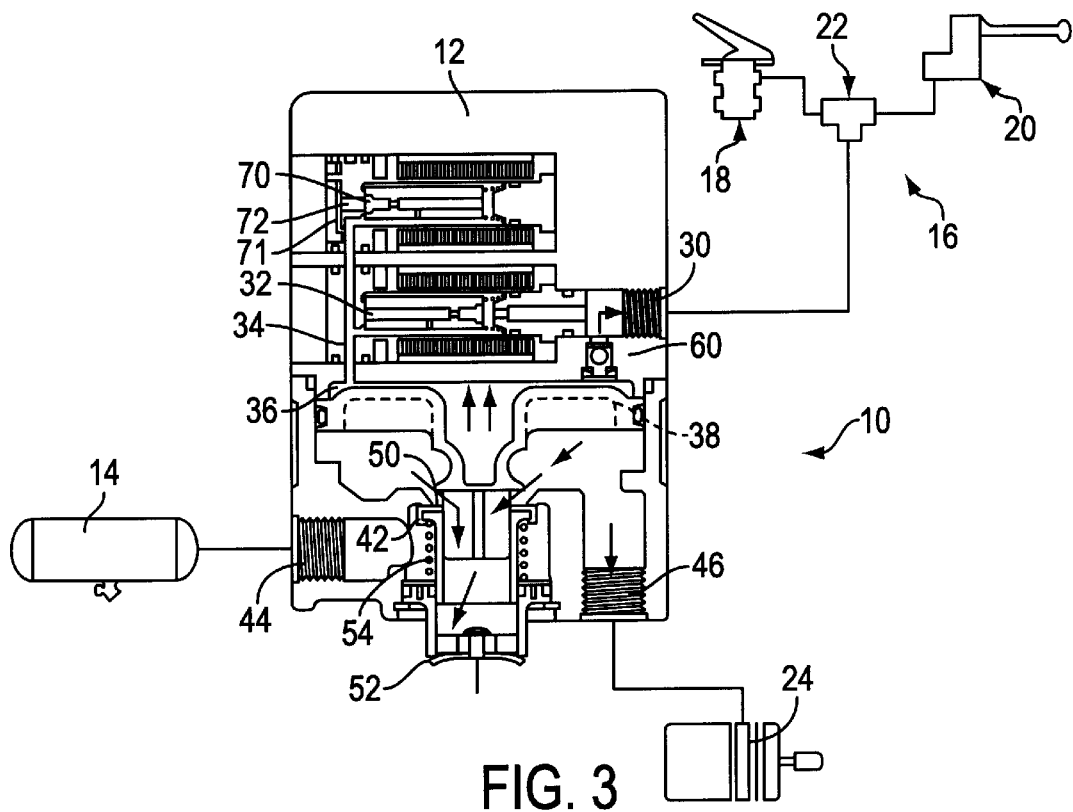
FIG. 3 illustrates the prior arrangement in a service application release position.

In FIG. 3, control pressure above the relay piston is exhausted as the valve 60 opens and air pressure is removed from the control port 30. The control piston also unseats from the valve seat 50 thus establishing communication between the brake chamber 24 and exhaust port 52. In this manner, the service brakes are released until the next brake application is demanded by the operator.

Figure 4:
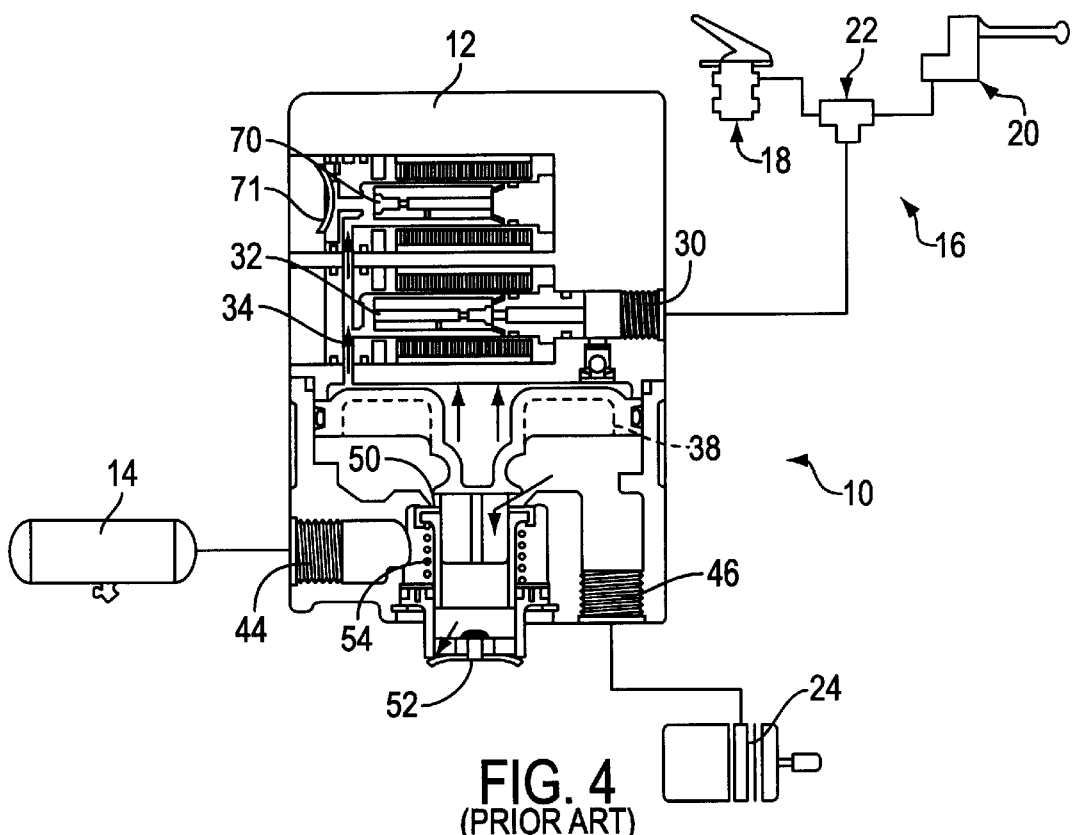
FIG. 4 illustrates ABS operation where the exhaust port of the solenoid assembly is opened to simulate pumping of the brakes.

FIG. 4 is representative of the antilock mode of the relay valve. Again, when an antilock controller senses impending wheel lock, electrical signals are sent to the supply solenoid 32 and exhaust solenoid 70. By selectively opening and closing the solenoids, brake pumping is simulated. More particularly, the supply solenoid is normally open and when closed prevents control line pressure from port 30 from further pressurizing control cavity 36. On the other hand, the exhaust solenoid 70 is normally closed. When opened, the exhaust solenoid provides a path for air pressure from the control volume 36, though passage 34, and through the restricted orifice to reach ambient pressure (as represented by the deflected shape of exhaust diaphragm 71).

Figure 5:
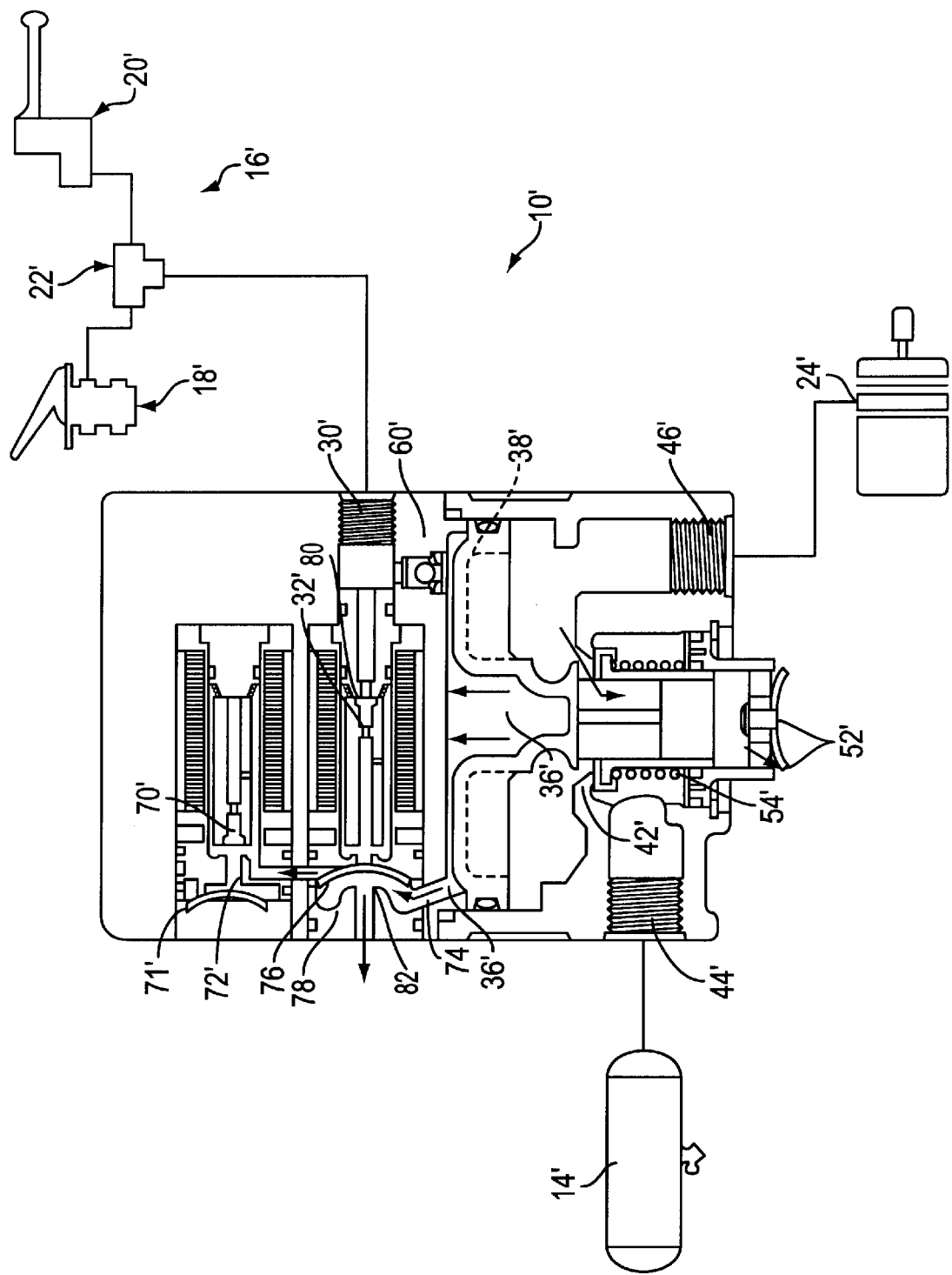
FIG. 5 is a schematic representation of the new invention.

Because of the restricted orifice 72 through the exhaust solenoid assembly, a need exists for improved ABS performance and the ability to rapidly exhaust air from the control volume. FIG. 5 illustrates the provision for a large exhaust passage 74 from the control cavity to an exhaust side of a diaphragm 76 of a quick release valve 78. As will be appreciated, the exhaust paths represented by passage 34 in the prior art embodiment of FIGS. 1–4 are preferably plugged to the exhaust solenoid. FIG. 5 shows a pressure modulating relay valve assembly 10'. Also, analagous to the features shown in FIGS. 1–4, FIG. 5 includes an air supply or pressurized air reservoir 14', control valve 16', foot-brake valve 18', trailer control valve 20', double check valve 22', service brake chamber 24', control port 30', supply solenoid valve assembly 32', control cavity 36', piston 38', inlet/exhaust valve seat 42', supply port 44', delivery port 46', exhaust port 52', spring 54', valve 60', exhaust solenoid 70', exhaust diaphragm 71', and orifice 72'. The additional passage 74 is cross-drilled in the housing to provide a large diameter passage 74 from the control volume to the exhaust side of the quick release valve 78. There is still a communication path between the supply side of the quick release diaphragm and the exhaust solenoid as represented by the arrow in FIG. 5. The exhaust solenoid need only exhaust a relatively small volume of air upstream of the quick release diaphragm 76. The majority of the control air in the control cavity 36' escapes directly to ambient through passage 74 and the quick release valve 78. This effectively achieves the rapid exhaust desired for improved ABS performance.

FIG. 5 shows the modulator relay assembly of the present invention in ABS exhaust mode, with the air in control cavity 36' being exhausted to ambient past valve seat 82 of the quick release valve 78. ABS exhaust is initiated by simultaneous movement of supply solenoid 32' to seal against supply solenoid seat 80 so as to cut off air pressure coming from control port 30', along with actuation of exhaust solenoid 70' to exhaust the air volume between diaphragm 76 and supply solenoid seat 80. This action removes the pressure from the upstream side of diaphragm 76 so that it is unseated from valve seat 82 to allow rapid exhaust of the air in control cavity 36' through passage 74. When the modulator is in the ABS build or hold modes where rapid exhaust through quick release valve 78 is not desired, the supply solenoid valve assembly air pressure from control port 30' maintains the diaphragm 76 in a position sealed against valve seat 82 so that no air is exhausted past quick release valve 78.

Figure 6:
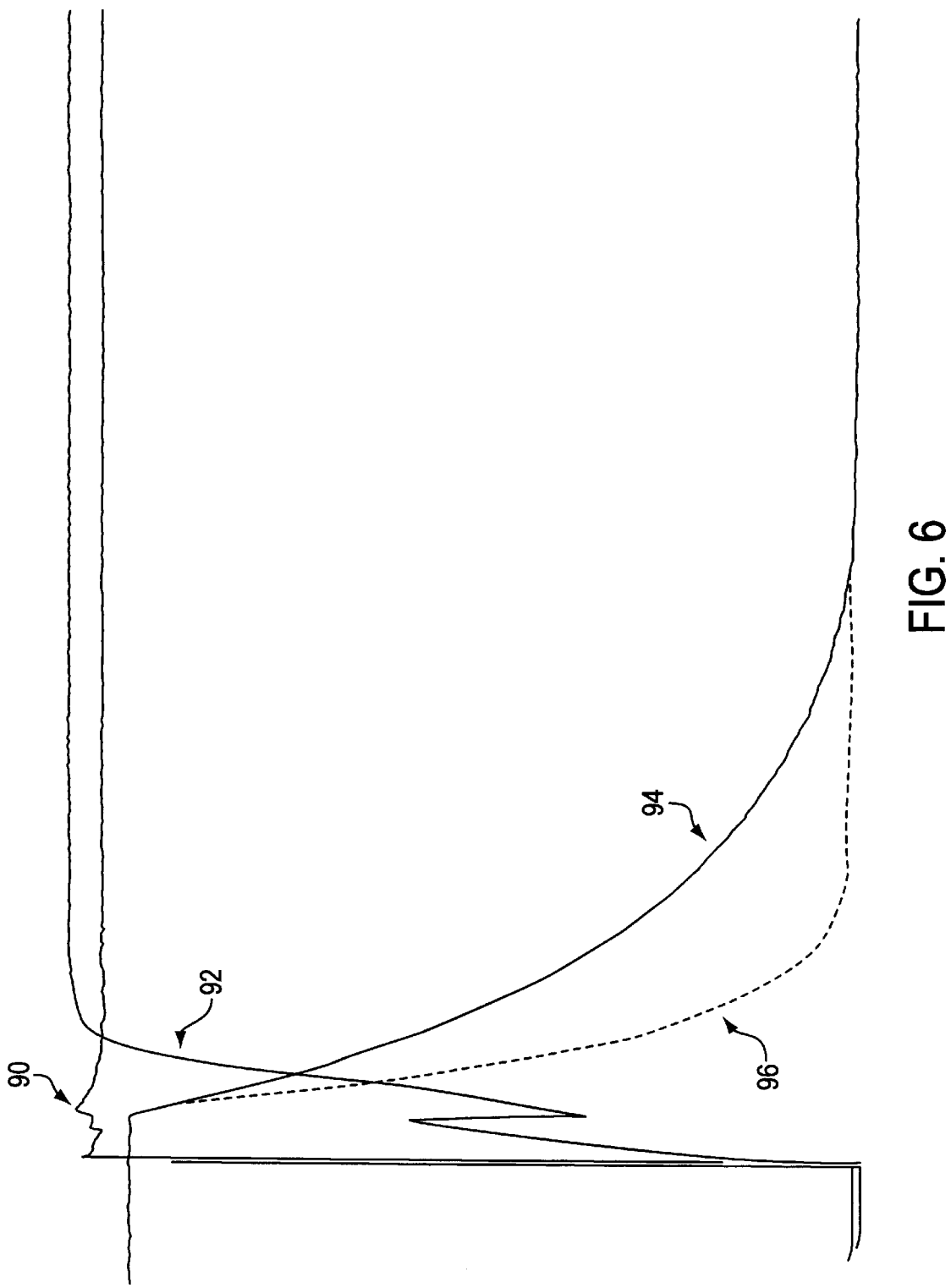
FIG. 6 is a graphical representation of the improved exhaust feature provided by the present invention.

FIG. 6 is a graphic representation of the improvement achieved with the present invention. Particularly, voltages are depicted by curve 90 in the graph. The solenoid current is represented by curve 92. The representative distinction between the embodiment of FIGS. 1–4 and that of FIG. 5 is best exemplified by a comparison of the air pressure curves 94, 96. Although the air pressure decreases rapidly as illustrated by curve 94, indicating release of air pressure in the control cavity upon energization of the exhaust solenoid, curve 96 has a steeper slope and more quickly exhausts the air pressure therefrom. Incorporating the quick release valve 78 and the large diameter passage 74 results in the increased slope and improved performance desired for ABS performance.

The invention has been described with reference to the preferred embodiment. Obviously, modifications and alterations will occur to other upon reading and understanding of this specification. For example, alternative designs of a quick release valve assembly can be used to rapidly and efficiently exhaust air from the control volume. The present invention is intended to include such modifications and alterations in so far as they come within the scope of the appended claims or the equivalents thereof.

Having thus described the invention, it is now claimed:

1. An ABS modulator relay valve assembly selectively controlling brake application to an associated brake chamber comprising:

a housing having a supply port, a delivery port, a control port, and an exhaust port;

a piston received in the housing defining a control volume and movable in response to a pressure signal from the control port to control communication among the supply, delivery, and exhaust ports; and hold and exhaust valve assemblies associated with antilock braking function in communication with the control volume and including a quick release valve disposed upstream of the exhaust valve to provide a passage from the control volume to atmosphere.

2. The valve assembly of claim 1 wherein the quick release valve includes a flexible member selectively engaging a valve seat.

3. The valve assembly of claim 2 wherein the valve seat is disposed at one end of the hold exhaust assembly.

4. The valve assembly of claim 1 wherein the hold and exhaust valve assemblies are solenoid valves having coils associated therewith to selectively actuate the hold and exhaust valve assemblies in response to an electrical control signal indicative of an ABS event.

5. The valve assembly of claim 1 wherein the quick release valve is integral to the hold valve assembly.

6. A method of quickly exhausting a control volume defined on one side of a piston in an antilock braking system having a hold valve and an exhaust valve operatively associated therewith, and control, supply, delivery, and exhaust ports selectively regulating supply of air to brake chambers associated with the wheels, the method comprising the steps of:

connecting the supply and delivery ports for service braking in response to a signal at the control port;

connecting the delivery and exhaust ports to release service braking in response to the absence of a signal at the control port;

controlling air pressure in the control volume via the hold and exhaust valves in response to an antilock control event; and exhausting a major portion of air from the control volume during the antilock control event through a quick release valve disposed upstream of the exhaust valve to increase performance response of the antilock braking system.

* * * * *